United States Patent [19]
Rosenkranz

[11] Patent Number: 5,402,862
[45] Date of Patent: Apr. 4, 1995

[54] SEALED LIFT UNIT

[75] Inventor: Alan Rosenkranz, Riviera Beach, Fla.

[73] Assignee: United Associates Group Inc., Riviera Beach, Fla.

[21] Appl. No.: 176,057

[22] Filed: Jan. 3, 1994

[51] Int. Cl.$^6$ ............................................. B66B 11/04
[52] U.S. Cl. .................................. 187/267; 384/15; 49/404; 187/233
[58] Field of Search ................... 187/9 R, 24, 1 R, 17; 160/28, 100; 254/98, 93 R; 49/404, 490.1, 480.1; 384/15

[56] References Cited

U.S. PATENT DOCUMENTS

| | | | |
|---|---|---|---|
| 150,658 | 5/1874 | King | 160/28 |
| 2,871,933 | 2/1959 | Kreger | 160/100 |
| 3,376,019 | 4/1968 | Weiss | 187/24 |
| 3,861,444 | 1/1975 | Portwood | 49/404 |
| 4,616,885 | 10/1986 | Komiya | 384/15 |

Primary Examiner—Kenneth W. Noland
Attorney, Agent, or Firm—Seidel, Gonda, Lavorgna & Monaco

[57] ABSTRACT

A lift has a member for supporting a material handling tool. The lift has a housing defining an interior and a longitudinally elongated slot orientated in the vertical direction. The housing has a wall encircling the slot. The member extends through the slot in the housing and moves in the longitudinal direction. A flexible closure strip has a length of at least twice the longitudinal length of the slot and is connected to the member at an approximate midpoint of the flexible closure strip and movable with the member. The flexible closure strip is in slideably sealing engagement with the slot. A pair of scroll boxes accumulates and dispenses the flexible closure strip as the member moves in the longitudinal direction. One of the scroll boxes is located in proximity to an upper wall portion of the wall and the other scroll box located in proximity to a lower wall portion of the wall. Each of the scroll boxes has a take-up roll biased by a spring towards an accumulated position and at least one guide bar for guiding the flexible closure strip. The flexible closure strip has a pair of side edges extending longitudinal. The side edges of the flexible closure strip slideably engage an elastomeric seal for sealing the slot.

6 Claims, 7 Drawing Sheets

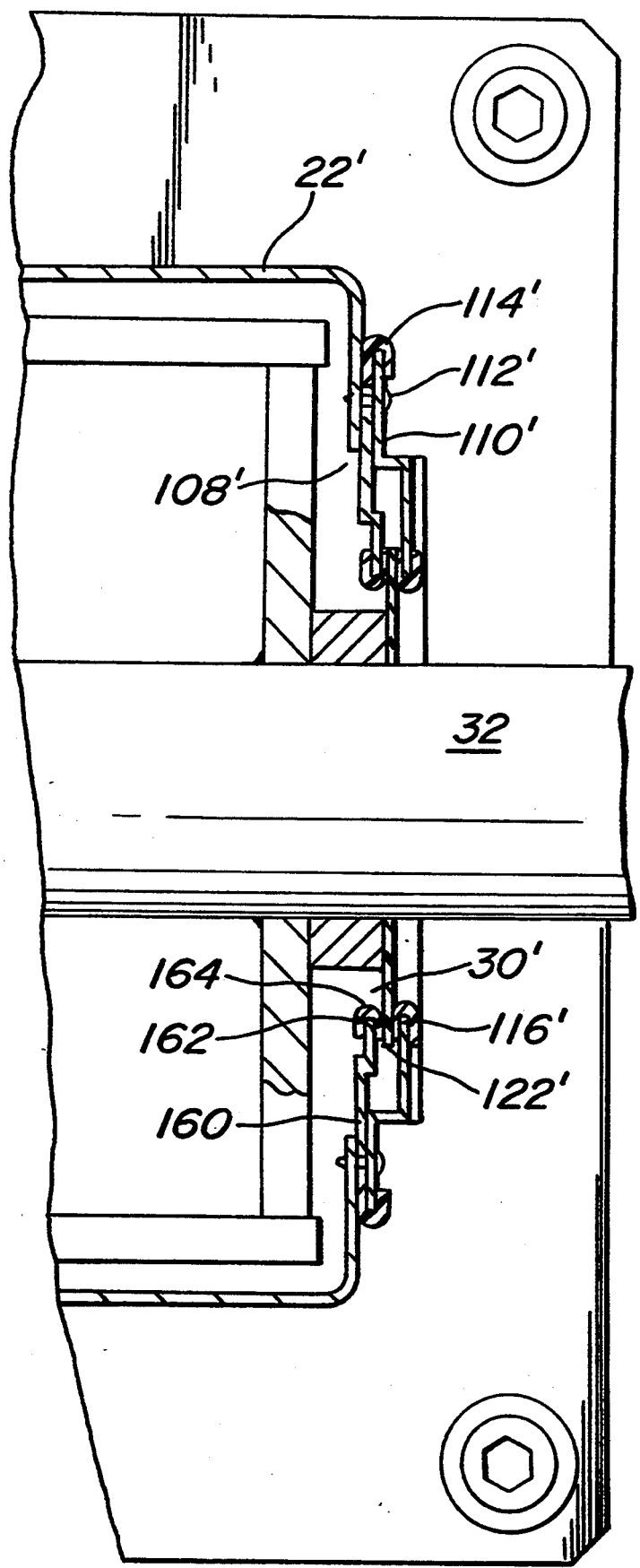

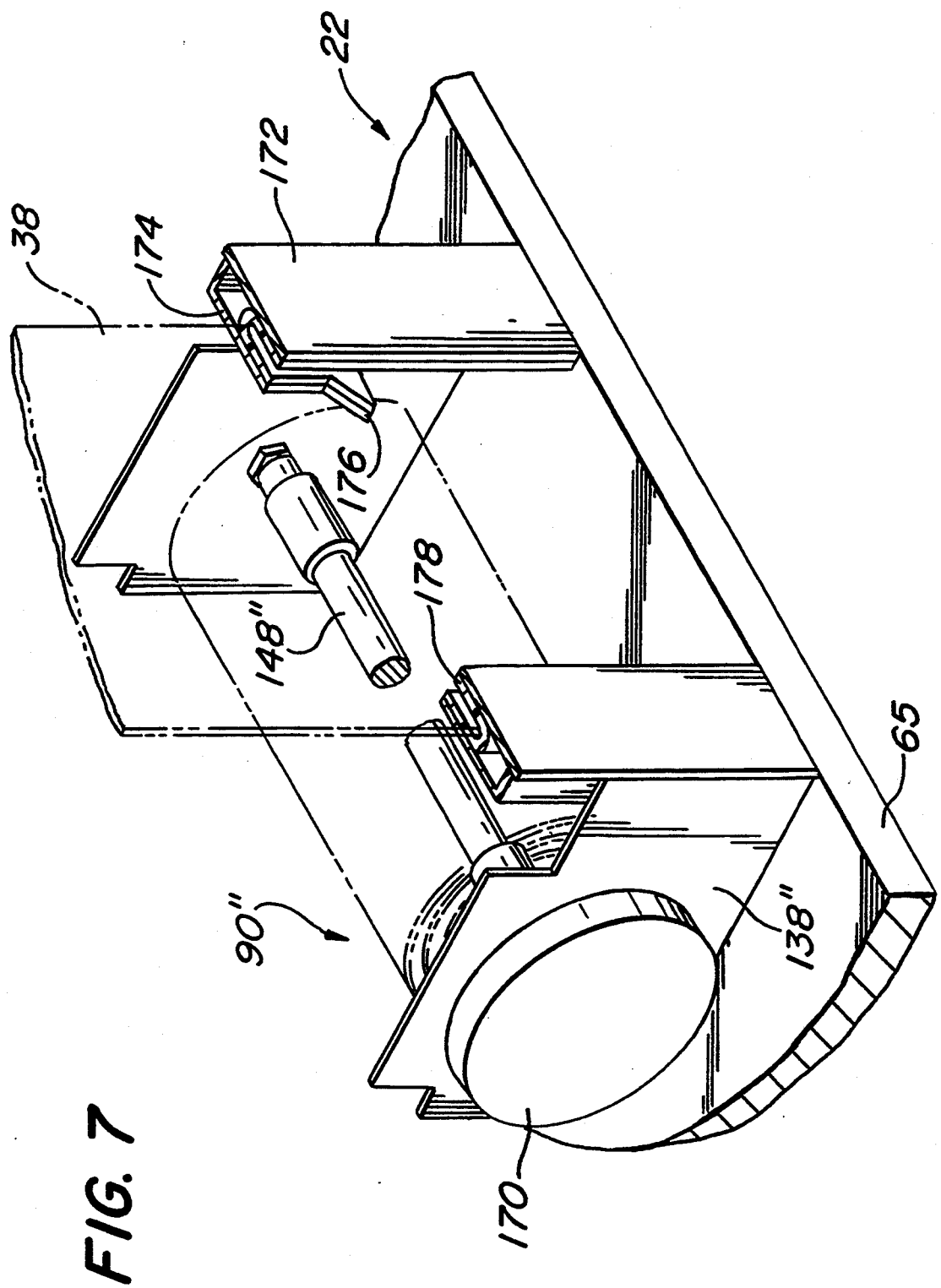

SEALED LIFT UNIT

FIELD OF THE INVENTION

This invention relates to a lift for material handling and more particularly to a lift that has a member which moves in a longitudinal direction through a longitudinal opening in the lift. The opening is sealed by a flexible closure strip that moves with the member.

BACKGROUND OF THE INVENTION

In the production and shipping of articles, it is well known to have machinery commonly referred to as material handlers to ease the process of moving units or bulk material. Material handlers include a broad range of equipment including conveyors, feeders, cranes, hoppers and lifts. Lifts are designed to raise and lower objects or containers containing the bulk material. The lift is typically prove and with a material handling tool such as a pair of fork tines or a barrel gripper. In cases where the material handling tool is a barrel gripper, the lift can be designed to also invert the container, if desired.

The level of cleanliness of the material handler is typically dependent on the location in which the material handler is used. It would be expected that a material handler located in a food or pharmaceutical plant would be maintained at a higher level of cleanliness than a material handler located in a furniture warehouse, on a construction site, or in a conventional landfill. Lifts used in food or pharmaceutical plants to move bulk grains, chemicals or drugs must be cleaned regularly to avoid contamination of the end product. However, while the exterior of the lift must be cleaned, care must be taken not to foul the inner works of the lift.

It has been recognized that reducing to a minimum the size of any openings between the inner works and the exterior would reduce the likelihood of contamination, whether by cleaning solution or the material being handled, from entering the lift works. It therefore is known to create a longitudinal slot through which a member which supports the material handling tool projects, to have only the minimal size required for the longitudinal movement of the member. It has also been recognized that if the slot is lined with brushes that flex out of the way of the member as it moves longitudinally or has a pair of elastomeric sheets which substantially cover the slot, and a slit extending longitudinally between the sheets wherein the sheets deform out of the way of the member, these structures will prevent large objects from entering through the slot into the inner works. However, these structures have shortcomings with respect to limiting small objects or fluids from entering the interior, since these structures do not conform in tight sealing engagement with the movable member.

It is desired to have a lift that has a member that receives a material handling tool, an opening for allowing longitudinal movement of the member, and a seal for sealing the opening, thereby sealing the interior of the lift.

SUMMARY OF THE INVENTION

This invention relates to a longitudinally elongated slot and a member extending through the slot wherein the member is movable longitudinally in the slot. A flexible closure strip has a length of at least twice the longitudinal length of the slot and is connected to the member at an approximate midpoint of the flexible closure strip and moves longitudinally with the member. The flexible closure strip is in slideably sealing engagement with the slot. A pair of scroll boxes accumulate and dispense the flexible closure strip as the member moves in the longitudinal direction. The scroll boxes are located in proximity to the longitudinal ends of the slot. Each of the scroll boxes has a take-up roll biased by a spring towards an accumulated position and at least one guide bar for guiding the flexible closure strip.

In a preferred embodiment, the flexible closure strip has a pair of side edges. The side edges of the flexible closure strip slideably engage an elastomeric seal for sealing the slot.

One object, feature and advantage of the invention is a flexible closure strip having a length of at least twice the longitudinal length of the slot and connected to a member at an approximate midpoint of the flexible closure strip and a pair of scroll boxes, each having a take-up roll biased by a spring towards an accumulated position and dispensing the flexible closure strip as the member moves.

Further objects, features and advantages of the present invention will become more apparent to those skilled in the art as the nature of the invention is better understood from the accompanying drawings and detailed descriptions.

BRIEF DESCRIPTION OF DRAWINGS

For the purpose of illustrating the invention, there is shown in the drawings a form which is presently preferred; it being understood, however, that this invention is not limited to the precise arrangements and instrumentalities shown.

FIG. 6 is a top sectional view similar to FIG. 3 showing an alternative embodiment of the flexible closure strip and seal; and FIG. 7 is a perspective view similar to FIG. 5 showing an alternative embodiment of the scroll box for the flexible closure strip.

DETAILED DESCRIPTION OF THE INVENTION

Figure 1:
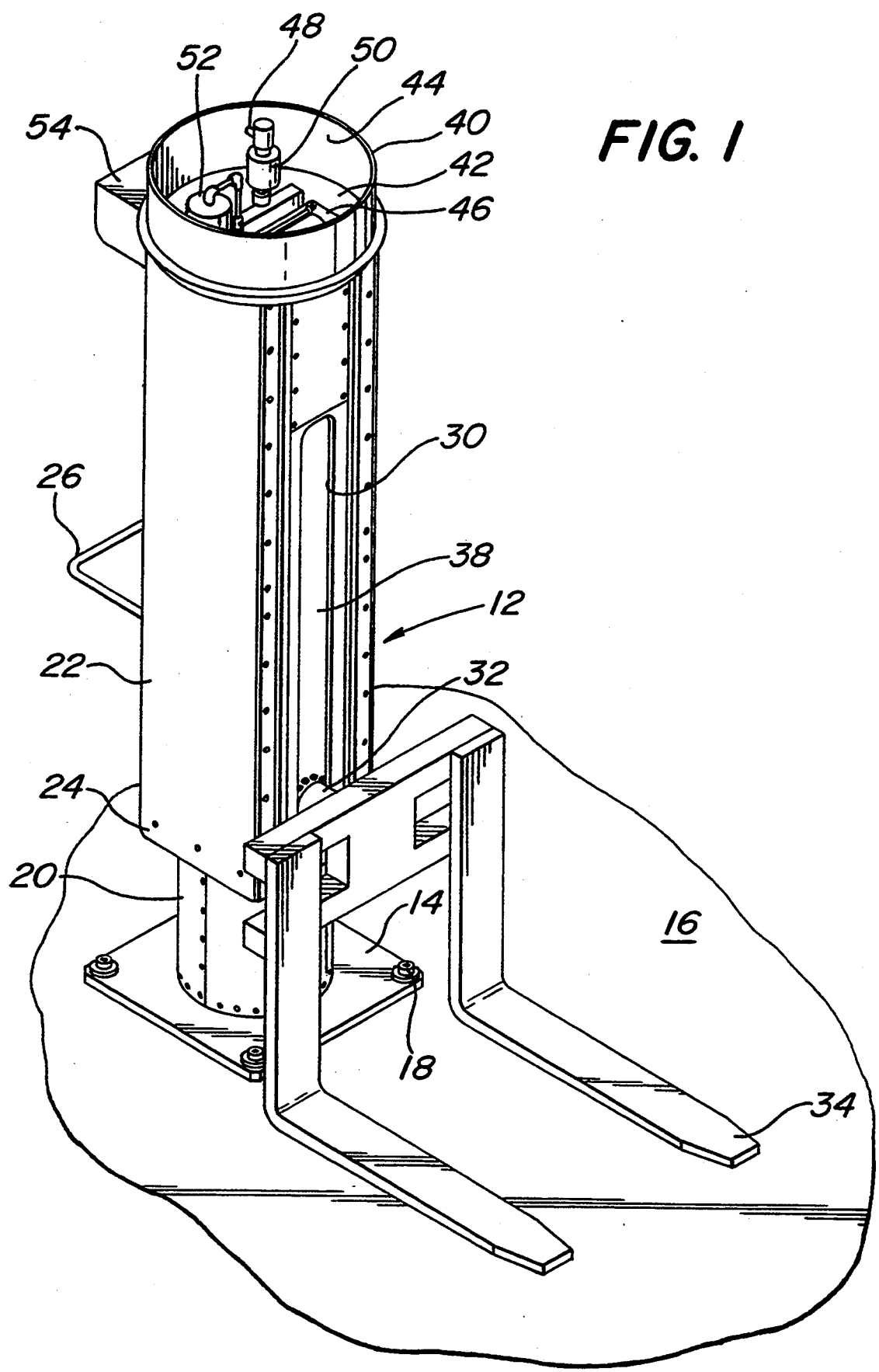
FIG. 1 is a perspective view of a stationary lift incorporating a seal according to the present invention.

Referring to the drawings in detail, where like numerals indicate like elements, there is illustrated in FIG. 1 a lift 12 according to the invention. The stationary lift 12 has a base 14 mounted on a floor 16 such as is located in a factory or warehouse, by fasteners such as lag bolts 18. The base 14 supports a lower housing 20, which projects upward from the base 14 and is stationary relative to the base 14. Lift 12 has an upper housing 22 which has a lower portion 24, which cooperates with the lower housing 20 to allow rotation of the upper housing 22 relative to the lower housing 20. A handle 26 allows an operator to rotate the upper housing 22 relative to the lower housing 20 and a braking/locking mechanism (not shown in FIG. 1 but described below) holds the upper housing 22 in position.

The upper housing 22 has a longitudinally elongated slot or opening 30 which runs generally vertically. A member or beam 32 extends through the slot 30 and supports a material handling tool 34, such as a forklift, barrel lift, or other tool (a forklift is shown). The member 32 moves translationally up and down in the slot 30 of the upper housing 22. A flexible closure strip 38 is connected to and moves with the member 32 and covers the slot 30.

The upper housing 22 of the stationary lift 12 has a cover 42 spaced from an upper edge 40 of the upper housing, defining a recessed area 44. An upper scroll box 46 located in the recessed area 44 accumulates and dispenses the flexible closure strip 38 as the member 32 moves up and down in the slot 30. The recessed area 44, in addition, contains an air inlet 48 through which the stationary lift 12 receives air pressure from an external source to move the member 32 and the supported material handling tool 34. A swivel couple 50 is located between the air inlet 48 and the upper housing 22 so that upon rotation of the upper housing 22, the hose of the air inlet 48 does not tangle with itself. In addition, the recessed area 44 has a coalester 52 for filtering the air.

Figure 2:
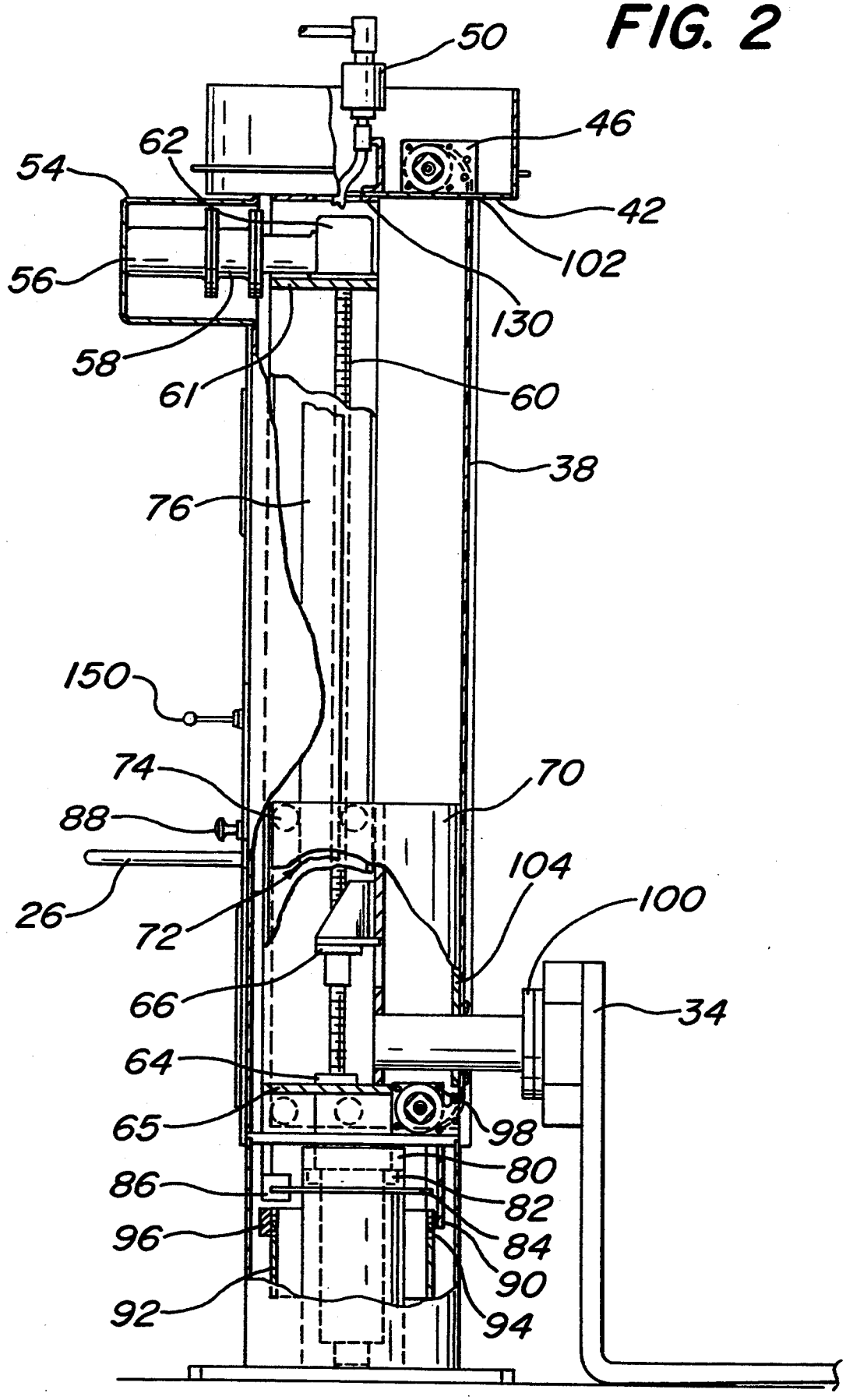
FIG. 2 is a side view of the stationary lift with portions broken away showing a flexible closure strip and a pair of scroll boxes.

Projecting outward from the upper housing 22, below the cover 42 and above the handle 26, is a box 54 which contains an air motor 56 and air brake 58 as seen in FIG. 2. The upper housing 22 has an upper rigid plate 61, located below the cover 42, upon which a gear box 62 is mounted. The upper housing 22 has in the lower portion 24 a lower rigid plate 65 which receives a lower ball screw bearing 64. A ball screw 60 extends vertically downward from the gear box 62 to the lower ball screw bearing 64. The air motor 56 rotates the screw 60 via the gear box 62. A ball nut 66 encircles the screw 60 and is mounted to a carriage 70. The ball nut 66 and the carriage 70 move vertically upward and downward, dependent on the direction of rotation of the screw 60. The member 32 extends vertically from the carriage 70 through the slot 30.

The upper housing 20 has a rail system 72 for guiding the carriage 70 as the carriage 70 moves translational upward and downward. The rail system 72 has a series of rollers 74 (shown in hidden line) located at the upper and lower ends of the carriage 70. The rail system 72 has vertical tracks 76 extend in the upper housing 20 between the lower rigid base 65 and the upper rigid plate 61. The rollers 74 ride on the track 76 to guide the carriage 70.

The upper housing 22 has a lower scroll box 98 mounted on the rigid plate 65 for receiving the flexible closure strip 38. The flexible closure strip 38 has a length in excess of twice the distance between the two scroll boxes 46 and 98 so that the slot 30 is always covered by closure strip 38 no matter where member 32 is located within slot 30. Consequently, approximately half of the total length of closure strip 38 is always located in one or the other of scroll boxes 48 and 98, as described below.

The cover 42 has a seal 102 from the recessed area 44 and the upper scroll box 46 to the interior of the upper housing 22 through which the flexible closure strip 38 extends. The member 32 has a plate 104 which engages the flexible closure strip 38 for sealing the flexible closure strip 38 to the member 32. The flexible closure strip 38 moves upwards and downwards with the member 32. As can be seen clearly in FIG. 2, the member 32 has an adaptor 100 for supporting the material handling tool 34.

The lower portion 24 of the upper housing 22 has a needle bearing 80. The upper end of the lower housing 20 has a thrust bearing 82. The needle bearing 80 rides on the thrust bearing 82, allowing the upper housing 22 to rotate relative to the lower housing 20. The lower housing 20 also has a brake disk 84. The upper housing 24 has a pair of brake pads 86 which engage the brake disk 84 for limiting the rotation of the upper housing roll 22 relative to the lower housing 24. A control handle 88 projects from the upper housing 22 and operates the pair of brake pads 86 using either pneumatic control or mechanical linkages.

In addition, the upper housing 22 has a depending stop cam 90. The lower housing 20 has an inner cylinder 92 having a series of holes 94 spaced in 5° increments in sets of two. A single or plurality of stop blocks 96 are mounted to the inner cylinder 92 via fasteners extending through the holes 94. The engagement of depending stop cam 90 with the stop block 96 limits the rotation of the upper housing 22 to the lower housing 20. Thereby, the rotation of upper housing 22 relative to the lower housing 20 can be limited to less than 360° arc.

Figure 3:
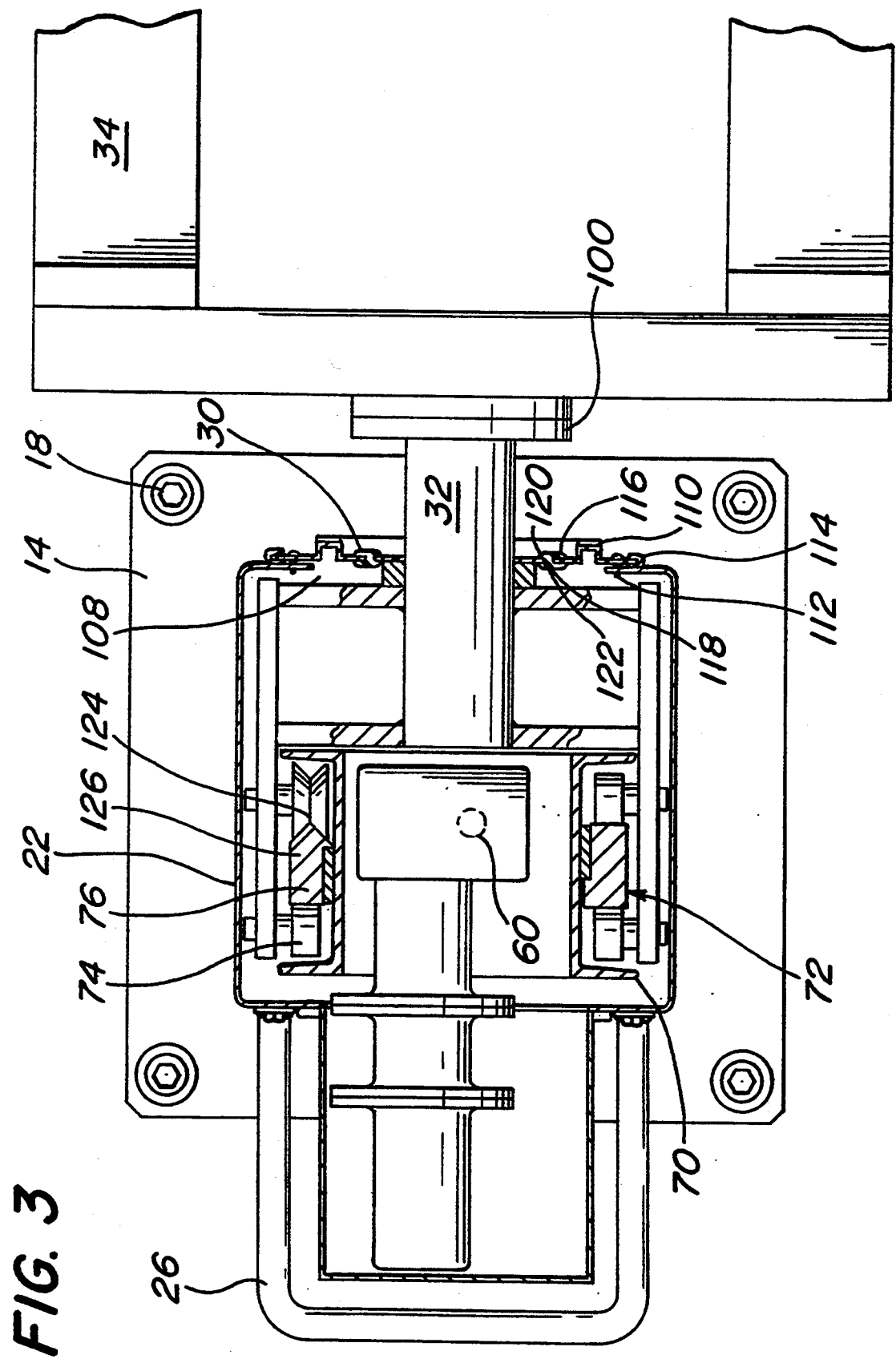
FIG. 3 is a top sectional view showing the interface of the flexible closure strip and a seal and in addition a rail system for guiding movement of the material handling tool.

Referring to FIG. 3, the upper housing 22 is generally rectangular in shape and has an opening 108 on one side. An outer plate 110 is secured by a plurality of fasteners 112 to the upper housing 22 overlying opening 108. An elastomeric seal 114 received by edges of the outer plate 110 seals the outer plate 110 to the upper housing 22. The outer plate 110 includes the longitudinally elongated slot 30 through which the member 32 extends.

The outer plate 110 has an edge wall 116 which encircles the perimeter of slot 30. A second elastomeric seal 118 is affixed to the edge wall 116 of outer plate 110. The elastomeric seal 118 has a pair of grooves 120. One groove receives the edge wall 116 of the inner plate 100 and the other groove receives a lateral or side edge 122 of the flexible closure strip 38. The flexible closure strip 38 is capable of moving vertically within the groove 120 of the elastomeric seal 118, as the member 32 moves vertically.

One of the tracks 76 of the rail system 72 has a crest 126 on one of its walls. One of the sets of rollers 74 of the rail system 72 has an indentation 124 for receiving the crest 126. The engagement of indentation 124 and crest 126 ensures that the carriage 70 does not shift laterally as the screw 60 (shown in hidden line in FIG. 3) rotates to raise and lower the carriage 70.

Figure 4:
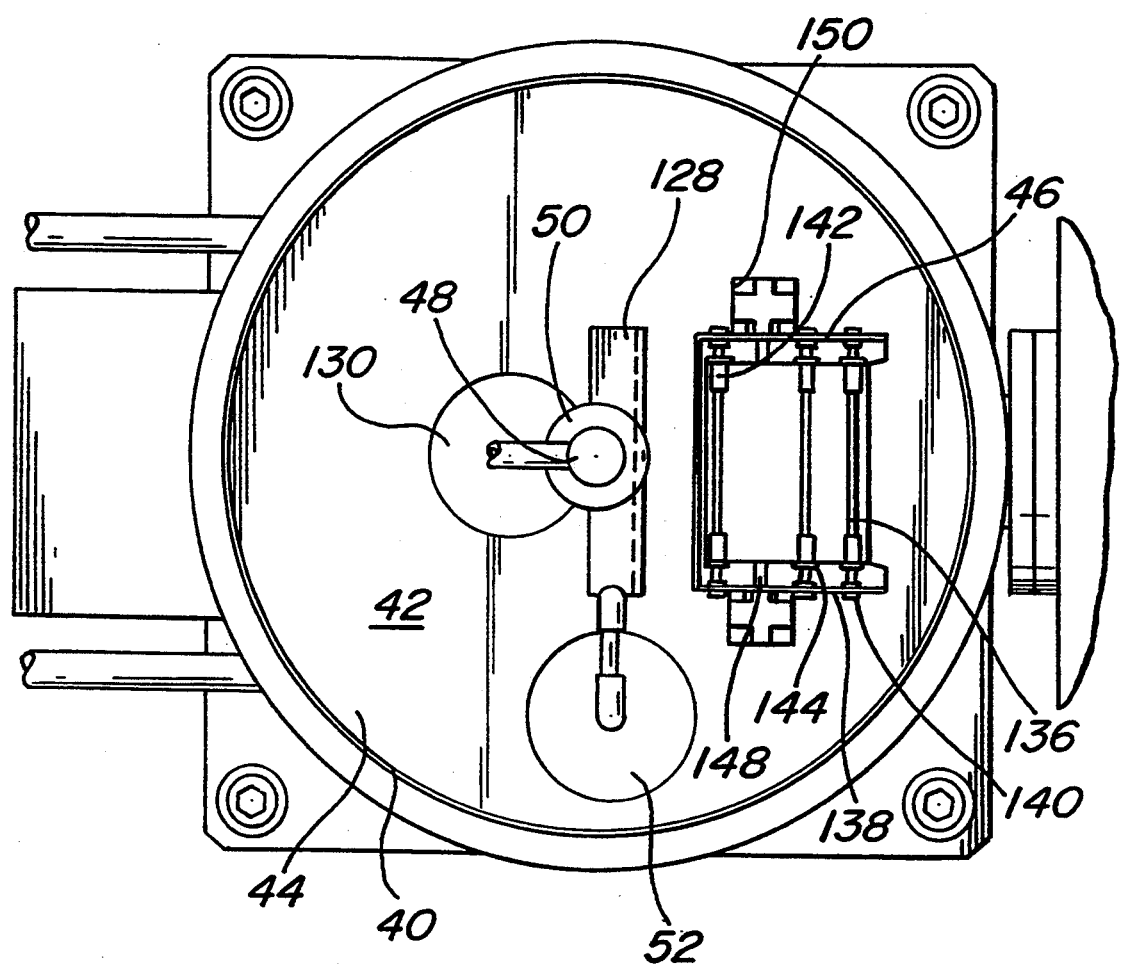
FIG. 4 is a top view of the stationary lift showing the air inlet, the coalescer and the scroll box for the flexible closure strip.

Referring to FIG. 4, the cover 42 of the recessed area 44 has a mounting bracket 128 which supports the swivel couple 50 and the coalescer 52. The cover 42 has an opening 130 through which tubing for the pneumatics enter the upper housing 22. In addition, the opening 130 ventilates the upper housing 22.

The scroll box 46 in the recessed area 44 has a "U" shaped bracket 134 which mounts to the cover 42. The scroll box 46 has six bars 136 which extend between a pair of side walls 138 of the "U" shaped bracket 134. The bars 136 space the side walls 138 and are secured to the side walls by a plurality of bolts 140. In addition, each bar 136 has a pair of sleeves 142. Each sleeve 142 has a lip 144 for guiding the flexible closure strip 38. The scroll box 46 has a take-up roll 148 for receiving the flexible closure strip 38. The take-up roll 148 extends through the side walls 138 into a pair of torsioning boxes 150. Each torsioning box 150 has a spiral-coiled spring 152, as seen in FIG. 5, which biases the flexible closure strip 38 towards a take-up position whereby the take-up roll 148 would receive all of the flexible closure strip 38.

Figure 5:
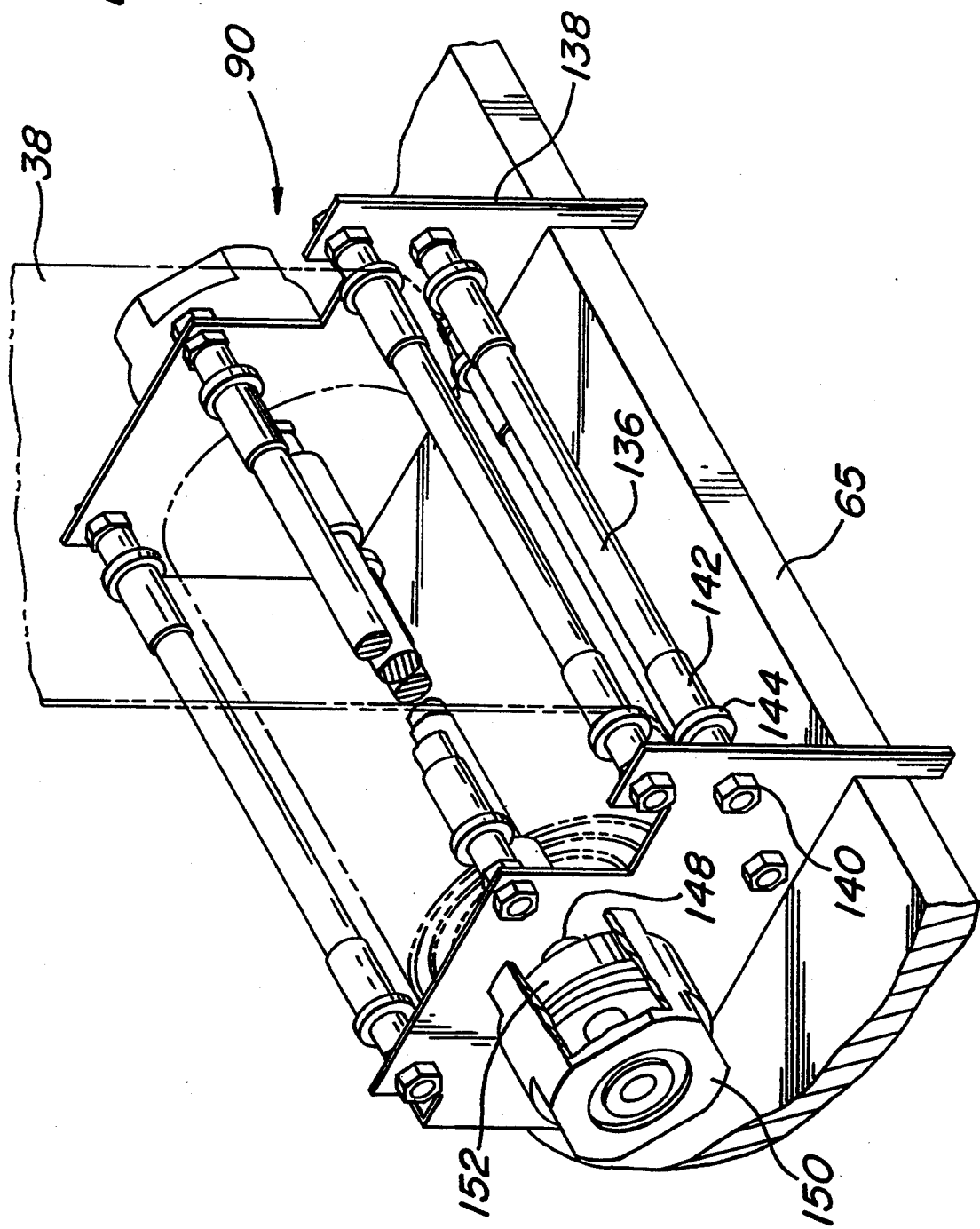
FIG. 5 is a perspective view of the lower scroll box.

Referring to FIG. 5, the lower scroll box 90 is shown in perspective. The lower scroll box 90 is identical to the upper scroll box 46 and has a pair of side walls 138 which mounts to the lower rigid base 65. The scroll box 90 has six bars 136 secured to the side walls by a plurality of bolts 140. Each bar 136 has a pair of sleeves 142. Each sleeve 142 has a lip 144 for guiding the flexible closure strip 38. The scroll box 46 has a take-up roll 148 for receiving the flexible closure strip 38. Each torsioning box 150 has a spiral coiled spring 152 which biases the flexible closure strip 38 towards the take-up position.

Referring to FIG. 6, an alternative embodiment of the seal is shown. The upper housing 22' has an opening 108' on one side. An outer plate 110' is secured by a plurality of fasteners 112' to the upper housing 22' overlying opening 108'. An elastomeric seal 114' received by edges of the outer plate 110' seals the outer plate 110' to the upper housing 22. An inner plate 160 located between the upper housing 22' and the outer plate 110' is likewise secured by the fasteners 112' to the upper housing 22'. Both the outer plate 110' and the inner plate 160 have the smaller longitudinally elongated slot 30' through which the member 32 projects. The outer plate 110' has an edge wall 116' which encircles the slot 30'. The inner plate 160 likewise has an edge wall 162 which encircles the slot 30'. An elastomeric seal 164 is affixed to each of the edge walls 116' and 162. A lateral edge 122' of the flexible closure strip 38' is located between the outer plate 100' and the inner plate 160 so that the elastomeric seals 164 each engage one of the sides of the flexible closure strip 38. The flexible closure strip 38 moves upward and downward with the member 32. In either embodiment, the upper wall and the lower wall of the elongated slot 30' are sealed as shown in FIG. 6. The elastomeric seal 164 engages each of the sides of the sides of the flexible closure strip 38.

Referring to FIG. 7, an alternative embodiment of the lower scroll box 90" is shown in perspective. The lower scroll box 90" has a pair of side walls 138" which mounts to the lower rigid base 65. The scroll box 90" has a take-up roll 148" for receiving the flexible closure strip 38. The take-up roll 148" extends through the side walls 138". The lower scroll box 90" has a single torsioning box 170. The torsioning box 170 has a spiral-coiled spring, not shown, similar to that shown in FIG. 5 which biases the flexible closure strip 38 towards a take-up position whereby the take-up roll 148 would receive all of the flexible closure strip 38. The upper housing 22 has a "U" shaped channel 172 which extends from the lower ridge base 65 to the upper ridge plate 61. The "U" shaped channel 172 has an inner leg 174. The inner leg 174 has a lower end 176. The lower end 176 of the inner plate 174 does not extend to the lower ridge base 65 and flanges inward to guide the flexible closure strip 38. The "U" shaped channel 172 has an elastomeric seal 178 that engages the sides of the flexible closure strip 38. The upper scroll box is similarly constructed.

Referring to FIG. 1, in operation, the operator moves an article by raising or lowering the material handling tool 34 or rotating the upper housing 22 relative to the lower housing 20. The material handling tool 34 is raised or lowered by employing a handle 150 which directs the air entering through the air inlet 48 to the air motor 56 to rotate the screw 60 clockwise or counterclockwise, or to the air brake 58 to hold the screw 60 in position. The ball nut 66 moves upwards and downwards on the screw 60 as the screw 60 rotates, therein raising and lowering the carriage 70 and the member 32. The flexible closure strip 38 is pulled by the member 32 and the plate 104 from the scroll box 46 or 90 away from which the member 32 is moving. The spiral coiled spring 142 of the scroll box 46 or 90 toward which the member 32 is moving pulls the flexible closure strip 38 towards it and around the take-up roll 138. When the member 32 is at the upper end of the slot 30, approximately half of the closure strip 38 is in the upper scroll box 46. Likewise, when the member 32 is at the lower end of the slot 30, approximately half of the closure strip 38 is in the lower scroll box 90. When the member 32 is between the ends of the slot 30, a portion of closure strip 38 is on both take-up rolls and the remainder of the closure strip 38 extends between the scroll boxes 46 and 90.

The edges of the flexible closure strip 38 are located in the groove 118 of the elastomeric seal 116 therein sealing the opening 30. As indicated before, the rail system 72 guides the translational movement of the carriage 70 in the upwards and downwards direction.

The operator, in addition, can rotate the upper housing 22 relative to the lower housing by releasing the brake pads 86 from the brake drum 84 by use of handle 88 and rotating the upper housing 22 using handle 26.

Upon completion of the desired material handling, the entire stationary lift 12 can be cleaned by spraying with a liquid such as a cleaning agent or water containing a cleaning solution. The flexible closure strip 38 covers the slot 30 with the elastomeric seal 116 completing the seal thereby preventing the cleaning solution from entering inside the stationary lift 12. The opening in the cover 42 allows for ventilation in the stationary lift 12 while limiting the likelihood of water or cleaning solution from entering the stationary lift 12.

The present invention may be embodied in other specific forms by departing from the spirit or central attributes thereof and, accordingly, reference should be made to the dependent claims, rather than to the foregone specification, as indicating the scope of the invention.

I claim:

1. A stationary lift having a member for receiving a material handling tool, the stationary lift comprising:
  a lower housing;
  an upper housing rotatably mounted to the lower housing;
  the upper housing defining an interior and having a longitudinally elongated slot orientated in the vertical direction, the housing having an edge wall encircling the slot, the edge wall having a pair of vertical walls portions and an upper wall portion and a lower wall portion;
  the member extending through the slot in the housing;
  drive means located in the interior for moving the member longitudinally in the slot;
  a flexible closure strip having a length of at least twice the longitudinal length of the slot and connected to the member at an approximate midpoint of the flexible closure strip, the flexible closure strip being in slideably sealing engagement with the slot;

a pair of scroll means for accumulating and dispensing the flexible closure strip as the member moves in the vertical direction, one of the scroll means located in proximity to the upper edge portion and the other scroll means located in proximity to the lower edge portion; and sealing means for slideably sealing the vertical edge portions of the edge wall encircling the slot relative to the vertical edges of the flexible closure strip and the upper edge portion and the lower edge portion relative to the flexible closure strip for closing the slot in the housing, wherein the flexible closure strip moves with the member, thereby sealing the slot in the housing.

2. A stationary lift as in claim 1, wherein each of the scroll means comprises a take-up roll biased by a spring means towards an accumulated position and at least one guide bar for guiding the flexible closure strip.

3. A stationary lift as in claim 1, wherein each of the scroll means comprises a pair of spaced side walls, a plurality of guide bars extending between the side walls, a take-up roll extending through the side walls and receiving the flexible closure strip between the side walls, a pair of torsion boxes, each torsion box positioned outboard on the side walls and having a spiral coiled spring for urging the flexible closure strip towards an accumulated position, and the guide bars having guide sleeves for guiding the flexible closure strip.

4. A stationary lift as in claim 3, wherein the upper housing has an upper edge and a cover spaced from the upper edge of the upper housing and defining a recessed area, and one of the scroll means is located in the recessed area and the other scroll means is located in the interior of the upper housing in proximity to the lower housing.

5. A stationary lift as in claim 1, wherein the sealing means comprises an elastomeric seal mounted on each of the vertical edge portions of the upper housing and the seal having a slot for slideably receiving the vertical edge of the flexible closure strip and an elastomeric seal mounted on the upper edge portion and the lower edge portion for engaging the flexible closure strip.

6. A stationary lift as in claim 1, further comprising an inner panel mounted to the upper housing, the inner panel having a longitudinally elongated slot and an edge wall encircling the slot, the edge wall of the inner panel spaced from the edge wall of the upper housing encircling the slot, and the sealing means having an elastomeric seal mounted on the edge wall of the upper housing encircling the slot and a second elastomeric seal mounted on the edge wall of the second panel, and the flexible closure strip interposed between and slideably engaging the elastomeric seal and the second elastomeric seal.

* * * * *